July 3, 1923. Re. 15,641

J. H. EMERY

ARTIFICIAL FRUIT AND METHOD OF PRODUCING SAME

Original Filed Jan. 24, 1921

INVENTOR
James H. Emery
BY
Fenn, Goodell & Marie
ATTORNEY

Reissued July 3, 1923. Re. 15,641

UNITED STATES PATENT OFFICE.

JAMES H. EMERY, OF INWOOD PARK, NEW YORK.

ARTIFICIAL FRUIT AND METHOD OF PRODUCING SAME.

Original No. 1,436,024, dated November 21, 1922, Serial No. 439,584, filed January 24, 1921. Application for reissue filed May 23, 1923. Serial No. 641,013.

*To all whom it may concern:*

Be it known that I, JAMES H. EMERY, a citizen of the United States, residing at Inwood Park, county of Nassau, and State of New York, have invented new and useful Improvements in Artificial Fruit and Methods of Producing Same, of which the following is a specification.

This invention relates to artificial fruit and similar imitations of natural objects, as ornaments, and to a method of producing such ornaments.

The principal object of the invention is to produce hollow imitations of natural objects such as fruit, or the like, which so closely resemble the natural articles as to be visually indistinguishable therefrom.

Another object is to produce an article of the character described which will be comparatively inexpensive and at the same time durable and capable of withstanding considerable handling.

A further object is to provide a simple, quick and economical method of producing such ornaments.

Further objects of the invention will be apparent as the description progresses.

This application is filed as a continuation in part of applicant's co-pending application, Serial No. 297,025, filed May 14, 1919.

Various embodiments of the invention are illustrated in the accompanying drawings in which—

In carrying out the invention, a suitable two-part mold or matrix of the natural object, to be imitated, is first produced in any suitable manner, but most desirably as described in applicant's co-pending application heretofore referred to. Then a suitable quantity of any convenient thermo-plastic composition, such, for instance, as a mixture of paraffin and carnauba wax in temporarily fluid condition, is introduced into one of the mold members and the other member united thereto so that said composition is securely sealed within the cavity. The thus charged mold is then given such motion as to cause the temporarily-fluid contents to spread over the inner surface of the enclosed cavity, and this movement is continued until the composition has become sufficiently solidified, by cooling, to retain its rotund shape—that is, the shape of the cavity itself corresponding to the shape of the original article. After the casting has cooled sufficiently to ensure solidifying of the thermo-plastic material, the mold is separated and the casting removed. Any slight burr or fin that may have been formed by the meeting surfaces of the two mold members is then removed, by hand, or other suitable means, and the casting may then be finished in accordance with the nature of the object, an imitation of which is to be produced.

Figure 1:
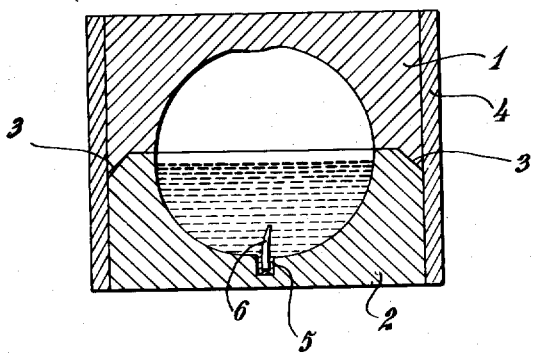
Fig. 1 is a central vertical section of one form of mold suitable for carrying out the invention.
Figure 2:
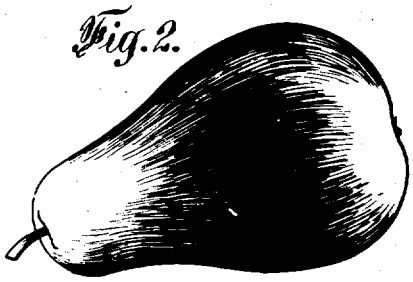
Fig. 2 is a perspective view of an artificial pear.
Figure 3:
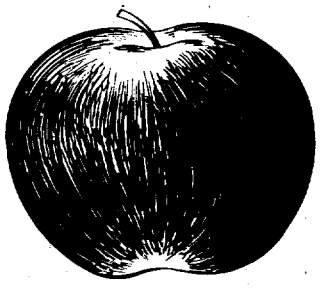
Fig. 3 is a similar view of an artificial apple.
Figure 4:
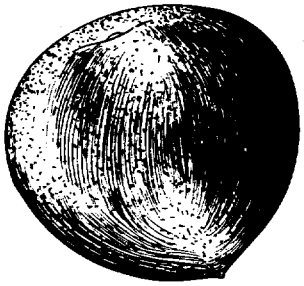
Fig. 4 is a similar view of an artificial peach.

In Fig. 1, there is shown a mold comprising an upper member 1 and lower member 2 having interlocking members as at 3 to prevent the sliding of one mold member relative to the other. The mold is shown enclosed within the boxing 4, used in making the same, but which may be removed after the mold is complete and during its subsequent use.

When uniformly colored fruit, such as oranges or plums, are being reproduced, it is only necessary to apply suitable coloring matter to the composition before it is cast. In the case of fruits such as pears, apples, or peaches, which are not of a uniform color, the thermo-plastic material is mixed with suitable base color before being cast and other coloring matter is applied to the surface of the casting to imitate that of the natural object.

In producing an imitation of a fruit having a stem attached, it has been found best to remove the stem, while making the mold, and thereafter to drill at the correct location in the bottom mold 2, a recess, such as 5, of approximately the same shape and size as the natural stem. A small twig 6 may then be inserted in the recess 5 and the mold then filled with the thermo-plastic material, some of which will surround the twig, which is thereby made an integral part of the resulting casting.

Figure 5:
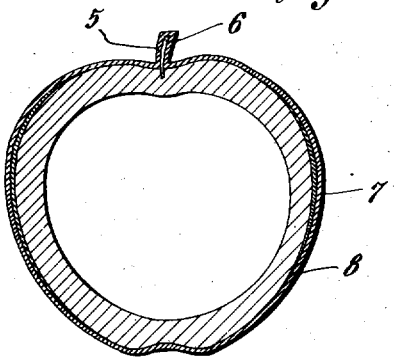
Fig. 5 is a central vertical section of the apple shown in Fig. 3.

In producing artificial apples, a suitably colored thermo-plastic composition is used to produce a hollow casting or shell with the stem attached and results in a casting having the same yellow color as that found near the stem and blow of a natural apple. The fin or burr is removed and red coloring material is then applied to that portion of the surface which is colored red in the natural article. As is well known, the red coloring of an apple is not solid and uniform but fine lines of the underlying yellow are visible through the red. In order to imitate this coloring, it has been found most desirable to apply the color in fluid rather than dry form. While various fluids may be employed as a medium to carry the color, it has been found that ordinary white flour paste is the best medium. Thus, a quantity of red coloring-matter is mixed with flour paste and water to the proper consistency and brightness, and when applied with a soft-bristle brush, adheres well to the wax surface and gives a practically perfect imitation of the red color of a natural apple. As seen at 8 in Fig. 5 the layer of coloring-matter is relatively thick at the equator of the apple and gradually thins out towards the stem and blow.

The color is allowed to dry and the stem and blow are then colored a dark brown, after which the whole apple is given a transparent protective coating 7, which is most desirably accomplished by immersing the same for a moment in a bath of molten transparent wax, a thin layer of which adheres to, and forms the protecting surface for, the artificial fruit.

When this layer is formed of a material generally similar to that of the casting, it will have substantially the same coefficient of expansion and will, upon cooling, adhere securely thereto, and in fact forms therewith a substantially homogeneous structure whose surface is free from cracks or other imperfections and which is extremely durable even under considerable handling.

In producing artificial pears, the process of making the hollow casting is identical with that just described for the apple. The coloring, however, is carried on somewhat differently since it is not desired to have any yellow grain showing through the red spots. However, the brilliancy of the red coloring must gradually diminish from the center of the red spot until the coloring merges with the yellow surface of the casting. To produce this result, finely ground dry Turkey-red is most desirably applied with a rather large brush, the bristles of which are compactly arranged in a circle. By gently tapping the pear at the place where the bright red should appear, the dry color is densely collected at that point and spatters out in all directions, gradually merging with the yellow base. The stem and blow are then colored the natural color and the pear is dipped in a bath similar to that employed for the apples, the resulting protective coating of transparent wax serving to permanently fix the applied color. In imitating peaches, the casting is made as previously described in the case of apples and pears, with the exception that no hole is drilled in the lower portion 2 of the mold since no stem is to be provided, the red coloring is most desirably applied in the manner described for coloring pears. As is well known, a peach has a relatively roughened surface and the coloring is not solid but interspersed with a fine fuzz of lighter color. When, therefore, the peach has been colored and dipped in the bath to acquire a protective coating, it is necessary to imitate the fuzzy surface of the natural article. This is done by rubbing the surface with a suitably colored finely divided abrasive, preferably pumice-powder, a sufficient quantity of which adheres to the surface to closely imitate that of the natural article, both in appearance and feeling.

There are a number of different thermoplastic materials which may be successfully employed in making the herein described castings or shells, and which when melted make a suitable bath in which to dip the colored castings to provide the transparent protective coating, but it has been found that the best results are obtained when a mixture of paraffin and carnauba wax, for example nine parts of paraffin to one part of carnauba is used.

The paraffin is comparatively inexpensive and easy to obtain of a uniform quality; but, by reason of its comparatively low melting-point and other characteristics, it does not possess the qualities necessary to serve alone in the production of an entirely satisfactory casting. By the addition thereto, however, of a harder wax-like substance having a substantially higher melting-point, such, for instance, as carnuaba wax, a casting of high quality and durability is produced.

While the invention has been described in connection with only a few of the many natural objects which are susceptible of successful imitation, it is to be understood that the process described may be applied with appropriate modifications to produce hollow imitations of almost any small natural object.

What I claim is:

1. The method of producing a hollow imitation of an object which consists of charging a multiple part mold of the object with a temporarily-fluid composition, next imparting a gyratory movement to the mold until the composition has solidified, next removing the resultant casting from the mold, then applying color to the surface of the casting and thereafter dipping the colored casting in temporarily-fluid transparent wax whereby a thin protective coating adheres to the surface of the casting, and then abrading the protective coating with powdered pumice.

2. The method of producing a hollow imitation of an object which consists of charging a multiple part mold of the object with a temporarily-fluid composition, next imparting a gyratory movement to the mold until the composition has solidified, next removing the resultant casting from the mold, then applying color to the surface of the casting, then applying a transparent protective coating to the colored casting and thereafter slightly abrading the protective coating with a finely powdered abasive.

3. The method of producing a hollow imitation of an object which consists of charging a multiple part mold of the object with a temporarily-fluid composition, next imparting a gyratory movement to the mold until the composition has solidified, next removing the resultant casting from the mold, then applying color to the surface of the casting, then applying a transparent protective coating to the colored casting and thereafter abrading the protective coating with finely powdered pumice, some of the pumice adhering to the coating.

4. The method of producing an imitation of an object such as a fruit, consisting in charging a multiple part mold of the object with a temporarily fluid mixture of a comparatively soft material such as paraffin mixed with a harder wax-like material such as carnauba wax, next forming a hollow casting of the mixture by imparting movement to the mold until the mixture has solidified, next removing the casting from the mold and applying color to the surface thereof, and thereafter applying to the colored casting a protective coating of substantially the same coefficient of expansion as the casting.

5. An imitation of a natural object comprising a continuous integral hollow casting of a composition composed of about 9 parts paraffin and 1 part carnauba wax.

6. An imitation of a natural object such as a fruit, consisting of a casting formed of a mixture of a comparatively soft material such as paraffin and a harder wax-like material such as carnauba wax, having on the surface color to imitate the natural object, and having a thin transparent coating of substantially the same coefficient of expansion as the casting.

7. An imitation of a natural object such as a fruit, consisting of a continuous integral hollow casting formed of a mixture of paraffin and a harder wax-like material substantially in the proportions of 9 to 1, respectively, having color applied to the surface thereof, and having a thin translucent coating of a material having substantially the same coefficient of expansion as the casting.

8. An imitation of a nautral object such as a fruit, consisting of an integral hollow casting formed of a wax-like material of uniform color throughout having some other color applied regionally to the surface thereof, and the whole enclosed by a thin translucent coating of a material having a coefficient of expansion substantially the same as that of the casting.

9. An imitation of a natural object such as a fruit, consisting of a body composed of a mixture of wax-like material comprising paraffin but of a substantially higher melting-point than paraffin, the surface of said body being provided with the desired coloring, and the whole being provided with a thin translucent coating of a material having substantially the same coefficient of expansion as the body itself.

10. An imitation of a natural object comprising a body of wax having colored flour paste applied to the surface thereof.

11. An imitation of a natural object comprising a continuous integral hollow casting of wax having color applied thereto and a transparent protective coating adhering to the surface of said casting, said protective coating being slightly abraded with pumice.

12. An imitation of a natural object comprising a continuous integral hollow casting of wax having color applied thereto and a coating of transparent wax adhering to the surface of said colored casting, together with a dusting of pumice for an abrasive coating.

13. An imitation of a natural object comprising a body of wax having color applied thereto and a protective coating of transparent wax about said body, the surface of said protective coating being slightly abraided with a finely powdered pumice.

14. An imitation of a natural object comprising a body of wax having color applied thereto and a protective coating of transparent wax about said body, the surface of said protective coating being abraded with finely powdered pumice, a thin dusting of said pumice adhering to said surface.

15. An imitation of a natural object such as a fruit, consisting of an integral hollow casting formed of a wax-like composition, comprising paraffin and a material having a substantially higher melting-point than paraffin, the surface of said casting having coloring matter to imitate the natural fruit, and the whole being provided with a thin translucent coating of a wax-like material having substantially the same coefficient of expansion as the casting.

JAMES H. EMERY.